(12) United States Patent
Kaplan (10) Patent No.: US 8,260,567 B1
(45) Date of Patent: Sep. 4, 2012

(54) SYSTEM AND METHOD FOR ANGLES-ONLY POSITION AND VELOCITY DETERMINATION USING CLOSED-FORM TRIANGULATION

(75) Inventor: George H. Kaplan, Colora, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 501 days.

(21) Appl. No.: 12/552,534

(22) Filed: Sep. 2, 2009

Related U.S. Application Data (60) Provisional application No. 61/098,415, filed on Sep. 19, 2008.

(51) Int. Cl.
G01P 11/00 (2006.01)
G06F 15/00 (2006.01)

(52) U.S. Cl. .......................... 702/142; 382/107; 250/393

(58) Field of Classification Search .................. 702/142, 702/145, 149, 150, 151, 152, 153, 155, 158, 702/189; 701/3, 120; 250/393; 340/976; 342/357.25, 451, 464; 382/103, 107, 141
See application file for complete search history.

(56) References Cited

U.S. PATENT DOCUMENTS

| 5,872,858 A * | 2/1999 | Kamada et al. | 382/107 |
| 7,952,079 B2 * | 5/2011 | Neustadter et al. | 250/393 |

OTHER PUBLICATIONS

M. Betke and L Gurvits, "Mobile Robot Localization Using Landmarks", IEEE Transactions on Robotics and Automation, vol. 13, No. 2, pp. 251-263 (Apr. 1997).
K. Briechle and U.D. Hanebeck, "Localization of a Mobile Robot Using Relative Bearing Measurements", IEEE Transactions on Robotics and Automation, vol. 20, No. 1, pp. 36-44 (Feb. 2004).

* cited by examiner

*Primary Examiner* — John H Le
(74) *Attorney, Agent, or Firm* — Amy L. Ressing; L. George Legg (57) ABSTRACT

Methods and systems are presented for determining position and velocity information using angles-only measurements for a moving observer in a three-dimensional space, in which three or more observations are obtained by the observer of objects with known positions, line of position vectors are generated which correspond to the individual observations, and position and velocity vectors for a chosen time are determined using a closed-form least-squares minimization over the Euclidian distances between each line of position vector and the observer's estimated position at the time of the observation.

19 Claims, 7 Drawing Sheets

SYSTEM AND METHOD FOR ANGLES-ONLY POSITION AND VELOCITY DETERMINATION USING CLOSED-FORM TRIANGULATION

REFERENCE TO RELATED APPLICATION

This application claims priority to and the benefit of U.S. Provisional Patent Application Ser. No. 61/098,415, filed Sep. 19, 2008, entitled "Closed-Form Navigation Method for Position and Velocity from Angular Observations", the entirety of which is hereby incorporated by reference.

FIELD OF THE DISCLOSURE

The present disclosure relates generally to navigation and position determination techniques and more particularly to angles-only navigation via closed-form triangulation for determining a moving observer's position and velocity in a three dimensional space.

BACKGROUND

Navigation of individuals requires knowledge of current position. Global Position System (GPS) satellite signals can be used to determine the current position, direction of motion, and speed (velocity) of a user via hand-held or vehicle-mounted GPS-equipped devices. At times, however, reception of the necessary GPS signals cannot be ensured, and alternate or supplemental systems and techniques are needed for determining an observer's current location and velocity for navigation control and other applications in which position and velocity information are useful.

SUMMARY OF DISCLOSURE

Various details of the present disclosure are hereinafter summarized to facilitate a basic understanding, where this summary is not an extensive overview of the disclosure, and is intended neither to identify certain elements of the disclosure, nor to delineate the scope thereof. Rather, the primary purpose of this summary is to present some concepts of the disclosure in a simplified form prior to the more detailed description that is presented hereinafter. An improved method is provided for determining position and velocity information for a moving observer in a three-dimensional space, which includes an observer obtaining three or more sequential observations of objects having known positions, and generating line of position (LOP) vectors that correspond to the individual observations. The method also includes determining an estimated position point and velocity information for the observer in the three-dimensional space for which Euclidian distances to the lines of position are minimum for the observer's estimated path using a closed-form least-squares minimization. The observations in some embodiments include at least one foreground object and at least one background object, such as foreground satellites orbiting Earth and background stars, where the background objects are at least two times more distant from the observer than are the foreground objects. The method may also include accuracy estimations in which post-solution residual vectors are formed which represent distances between the LOP vectors and the observer's estimated path, based on the observer's determined position and velocity, and the accuracy of the position and velocity information is estimated according to the residual vectors. The method may also include an estimation of the curvature of the observer's path.

A position and velocity determination system is disclosed, including an imaging apparatus to obtain observation images of objects and a digital processing system. The digital processing system generates LOP vectors individually corresponding to one of the observations using known positions of the observed objects. In addition, the processing system is further operative to determine at least one estimated position point in the three-dimensional space, together with a velocity vector, for which Euclidian distances to the line of position vectors are minimum for the observer's estimated path using a closed-form least-squares minimization. The system in certain embodiments may include a position database storing the known positions of the observed objects, or these may be obtained from an external source, and some of the observed objects may be in motion. The digital processing system in some embodiments is operative to form post-solution residual vectors representing distances between the LOP vectors and the determined observer's positions as a function of time, and to estimate an accuracy of the position and velocity information at least in part according to the residual vectors. The processing system, moreover, may use an estimate of the curvature of the observer's path, in order to minimize the errors of the method for observations taken over extended periods of time.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrated examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION OF THE DISCLOSURE

One or more embodiments or implementations are hereinafter described in conjunction with the drawings, where like reference numerals are used to refer to like elements throughout, and where the various features are not necessarily drawn to scale.

Figure 1:
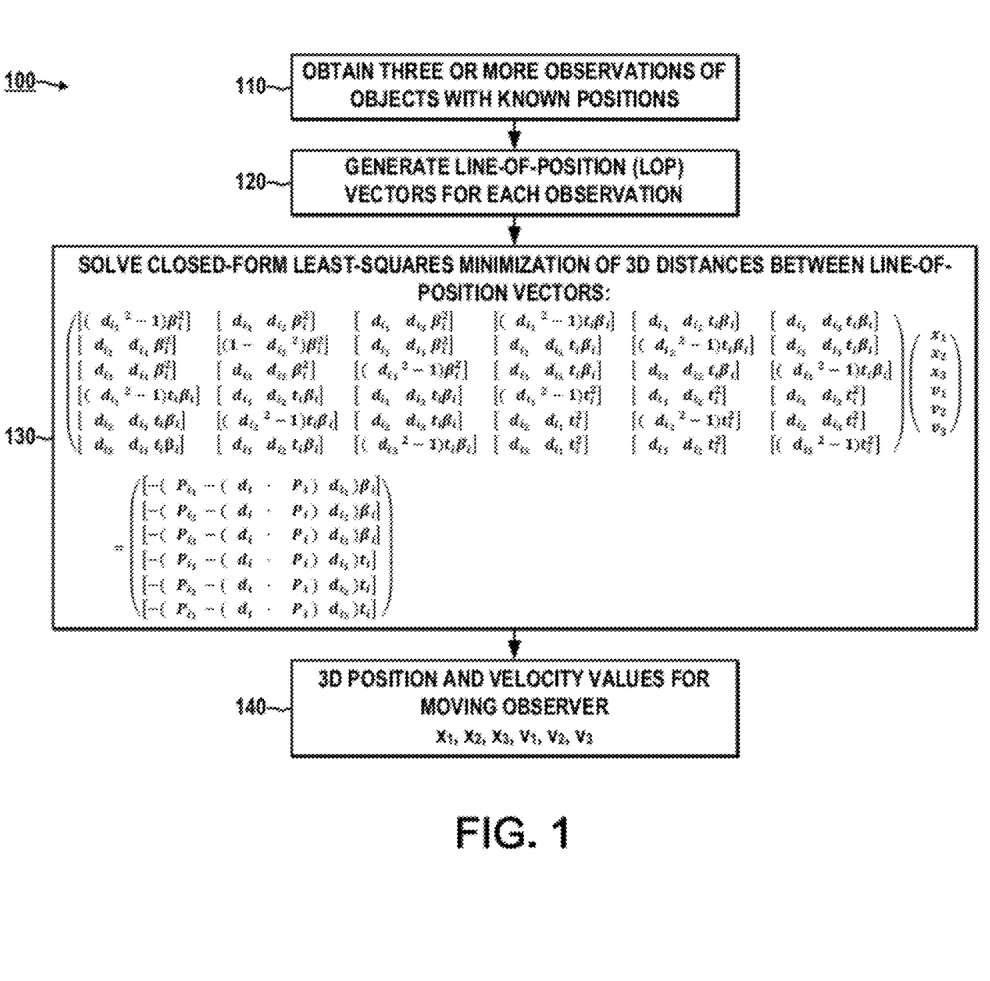
FIG. 1 is a flow diagram illustrating an exemplary method for determining position and velocity information for a moving observer in a three-dimensional space according to one or more aspects of the present disclosure.
Figure 2:
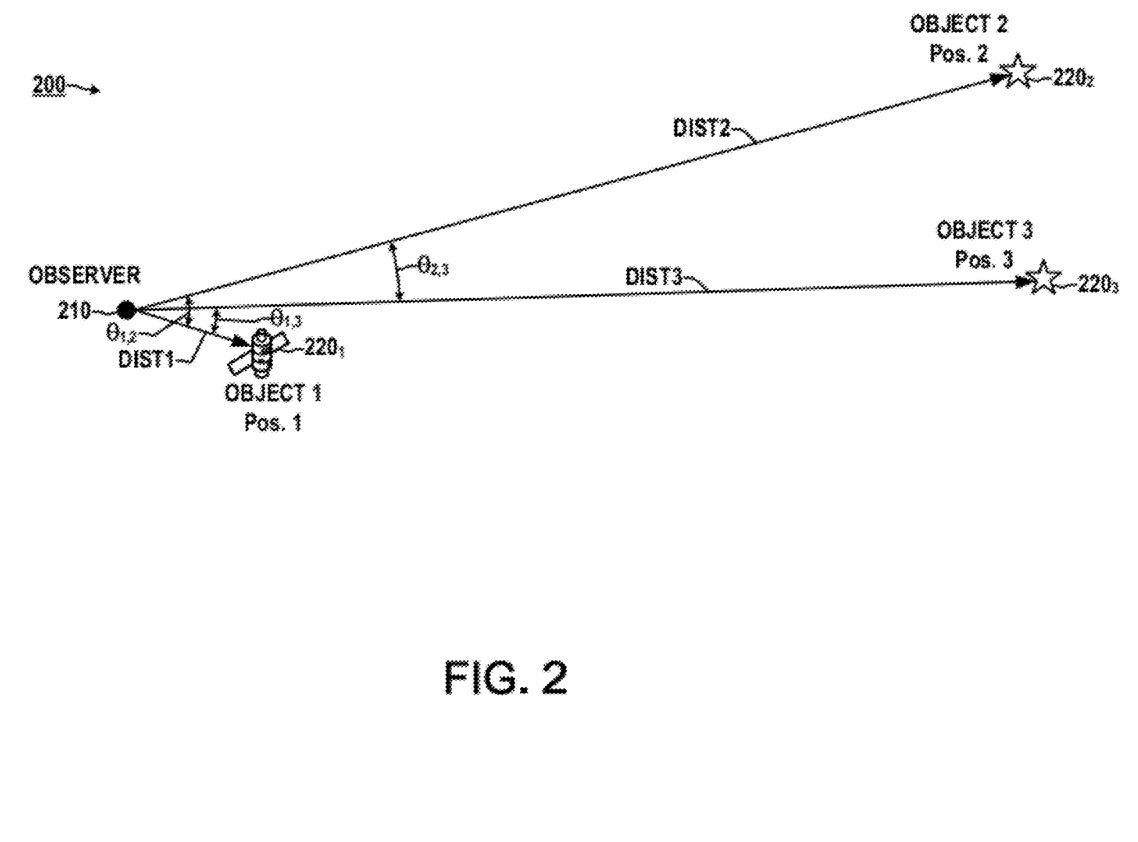
FIG. 2 is a partial perspective view showing an exemplary observer obtaining an observation image of a moving satellite object in the foreground and two background stars having known locations for use in angles-only determination of the observer's position and velocity.
Figure 3:
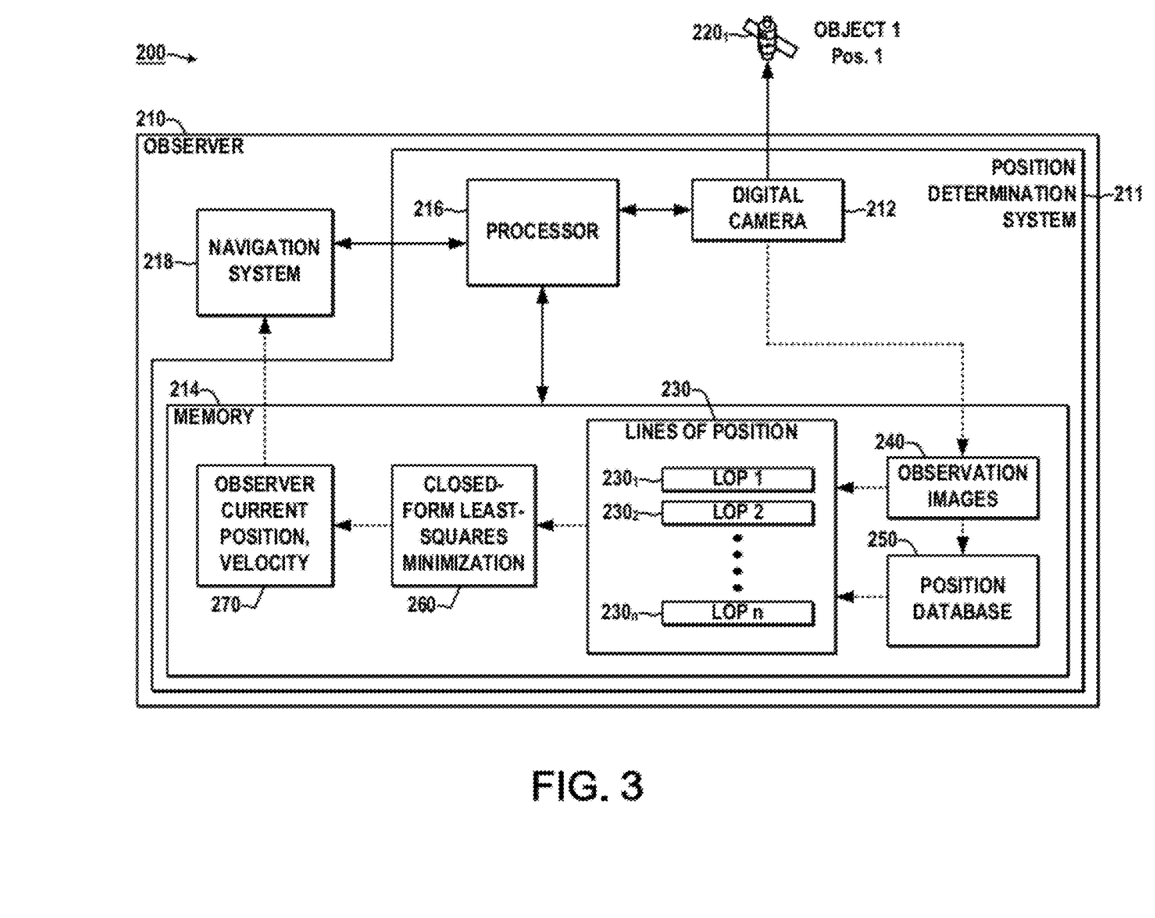
FIG. 3 is a schematic diagram illustrating an exemplary system for determining position and velocity information for a moving observer in accordance with the present disclosure.

Referring initially to FIGS. 1-3, a method 100 is depicted in FIG. 1 for determining position and velocity information 270 for a moving observer 210 in a three-dimensional space 200. The present disclosure provides an angles-only technique for position and velocity determination based on optical images of landmarks, stars, satellites or other observable objects that uses a closed-form solution which does not require initial position seed values for operation. The described method 100 can thus be employed in systems carried by observers or in vehicle/ship/aircraft navigation systems to supplement GPS-based apparatus or to replace such when GPS signals are jammed or otherwise become unusable. FIG. 2 shows a simplified situation in which an observer 210 obtains an optical (e.g., visible, near-infrared, etc.) image of observed near (foreground) and distant (background) objects 220 having known (or obtainable) positions from which the method generates a line or position (LOP) vector for use in estimating the observer's location and velocity in a three-dimensional space 200. FIG. 3 illustrates components of an exemplary observer 210 equipped with a position determination system 211 having a digital camera 212 and processing components 214, 216 configured to provide the observer's position and velocity by imaging the observed objects 220.

Angles-only navigation (alternatively referred to as 'bearings-only' navigation) allows position, velocity, and/or orientation data to be obtained through measuring the apparent angles, or angular rates, of relatively nearby objects without knowing the distances to the objects. In the situation of FIG. 2, for instance, a moving observer system 210 may be able to obtain an optical image (an observation) 240 of a satellite object $220_1$ together with stars $220_2$ and $220_3$ having known positions in the three-dimensional space at the time of observation 200, and the relative angles $\theta_{1,2}$, $\theta_{2,3}$, and $\theta_{1,3}$ can establish the observer's location along a line of position in space 200, even if the observer 210 and/or one or more of the objects 220 are in motion. Thus, based only on the angles θ and the known positions of the observed objects 220, along with at least two other such observations 240, the system 211 in the observer's vehicle (land-based vehicle, ship, aircraft, spacecraft, etc.) can continue to utilize on-board navigation systems 218 if GPS or other location-finding systems become inoperative, or the angles-only navigation can be used to augment such other navigational implements (e.g. dead reckoning, inertial, or GPS). Conventional systems that employ angles-only navigation record an optical view or scene from which measurements are taken, and these are provided (alone or together with data from other sensors) to a navigational Kalman filter that continually updates an observer's state vector including position, velocity, and attitude information at each incremental step of the observer's computed trajectory or path.

The methods of the present disclosure employ angles-only measurements together with a closed-form minimization solution to yield state vector information without requiring initial position input values as is the case in Kalman filter implementations, and thus provide a highly useful compliment/alternative to GPS based location systems, particularly where GPS signals may be lost without any advance warning and/or where no initial position information is known when navigation systems must be employed. In the embodiments illustrated and described below, a closed-form algorithm is used for angles-only navigation for both position and velocity that does not require any prior estimate of the observer's position or motion via a least-squares-based triangulation involving only angular observations of objects 220 with known (or retrievable) coordinates in a three-dimensional space 200. The process 100, moreover, is absolute as involving observations expressed in the same reference system 200 as the object coordinates, with the determined position and velocity in the same coordinate system, and thus finds particular utility in situations where a foreground object (e.g., satellite $220_1$ in FIG. 2) is observed against one or more background objects (stars $220_2$, $220_3$) and coordinates are available for the observed objects 220. In one embodiment, the distances DIST2, DIST3 from the observer 210 to the background objects $220_2$, $220_3$ are both more than twice the distance DIST1 to the foreground object $220_1$, even though the distances are initially unknown. The position, volocity, and attitude information 270 obtainable through the disclosed techniques can therefore provide a backup to ordinary GPS navigation, as well as provide a precise absolute attitude reference.

The method 100 begins at 110 in FIG. 1 where an integer number n sequential observations 240 are obtained by the observer 210 of objects 220 with known positions, relative to background objects also with known positions, where n is three or more. In the exemplary system 211 of FIG. 3, a navigation system 218 is provided with the observer's position and velocity 270 from a position determination system 211 that includes a processor component 216, such as a microprocessor, microcontroller, configurable logic, or other configurable or programmable hardware in combination with firmware, software, microcode, or other instructions, as well as a memory 214 that may store computer-executable program instructions and data to implement the functionality described herein including the method 100. In the illustrated system 211 in FIG. 3, the navigation system 218 prompts the system 211 for a position reading, and the processor 216 controls the digital camera 212 to obtain one or more observation images 240 that are saved in the memory 214. Alternative embodiments include systems in which the object locations may be obtained from external sources, for example, to get updated location data for moving satellites. Moreover, the position information may be obtained in the form of data in a different coordinate system than the three-dimensional space 200 in which the observer 210 is referenced, and suitable transformations may be performed in the system 211 or externally prior to providing the observed object locations 250 to the system 211. One or more of the observed objects 220 can be moving while the images 240 are being taken, such as the satellite object 220 of FIG. 2.

At 120 in FIG. 1, line of position (LOP) vectors 230 are generated in the three-dimensional space 200, which individually correspond to the observations 240. In the system 211 in FIG. 3, for example, the images 240 and observed objects 220 therein are associated with known object positions 250 from the on-board position database 250 and these are used to generate corresponding LOP vectors $230_1$-$230_n$, where n is a positive integer greater than 2 corresponding to the number of objects 220 observed by the observer 210. Any suitable technique can be used to generate the LOP vectors 230 at 120, such as the examples described below in greater detail. An estimated position point, together with an estimated velocity vector, are determined at 130 in the three-dimensional space 200 for which Euclidian distances $\delta_i$ (i=1 to n) to the line of position LOP vectors, for the observer's estimated path 230 are minimum using a closed-form least-squares minimization 260, which is stored in the memory 214 in the example of FIG. 3. At 140, the position and velocity information 270 is determined for the observer 210. In certain embodiments, the method 100 may further include forming post-solution residual vectors having lengths $\delta_i$ (FIG. 7 below) representing distances between the line of position LOP vectors 230 and the determined observer positions 210 at the time of the respective observations, and the accuracy of the observer position and velocity information 270 can be estimated by the system 211 based in whole or in part on the residual vectors. The method 100, moreover, may include estimating the curvature of the observer's path based at least partially on the estimated position and velocity.

The method 100 and the system 211 can be employed to determine both the position and velocity vectors of an observer (e.g., an imaging system) from the beginning using a number of angular measurements (e.g., the θ's in FIG. 2 above) of the apparent directions of identifiable objects with known coordinates that may be distributed over a considerable period of time. The angular measurements θ, moreover, are differential, that is, they are measures of the apparent direction of one object relative to another within the image, and are independent of the direction of the imaging system and observer, and are expressed in the reference system 200 used for the object coordinates (and the navigation solution). Consequently, the technique of the method 100 and the system 211 does not require a simultaneous attitude solution or any kind of object-space-image-space mapping, and can be advantageously employed in any system that captures scenes (observation images 240) in which foreground features (satellite $220_1$) appear against background features (stars $220_2$, $220_3$), and geodetic coordinates can be obtained for both near and far objects 220. Furthermore, for a moving observer 210 (e.g., ships at sea, aircraft, land-based vehicles, spacecraft, etc.), the angular observations may be taken at various positions along the observer's track or path (e.g., FIG. 6 below), and may be uncorrelated, thus having normally distributed random errors but no significant systematic errors. The technique, moreover, minimizes the effects of errors in both the observations 240 and the assumed object coordinates 250 in a least-squares sense.

Figure 4:
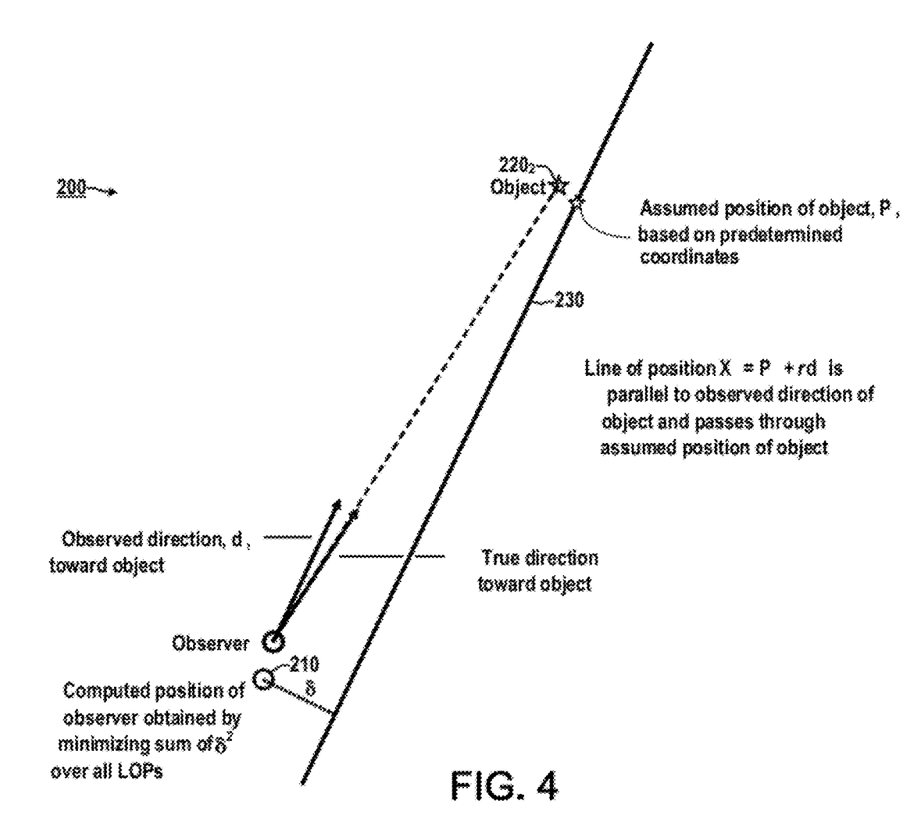
FIG. 4 is a partial side elevation view illustrating an observer obtaining an observation image of an observed start object and a corresponding line-of-position vector (LOP)

Referring also to FIG. 4, with vector quantities hereinafter indicated in bold, for each observed object 220, the system 211 uses the predetermined coordinates 250 (e.g., x, y, and z values in a 3D coordinate space 200), represented as a position vector P along with the observation image 240 represented in FIG. 4 by a directional unit vector d. The vector a' is established using the background objects in the image (not shown in FIG. 4). Absent errors, the observer 210 is located at a certain point on an associated line of position (LOP) 230 in the three-dimensional space 200, where the LOP 230 is defined by the equation X=P+r d where X is the position of an arbitrary point along the line and r is a scalar that can take on any real value. The components of the vectors X and P and the scalar r have units of length, while d is dimensionless. X. P and d, moreover, may be functions of time, and for a moving observed object (such as the satellite $220_1$ in FIG. 2). the time series of vectors P(t) is referred to as its ephemeris. In operation. P and d are given in, or reduced to, a common coordinate system 200. For example, if a foreground object 220 is observed against a background object, and both have coordinates in the same database 250, then the direction vector d is simply the difference between the known position vectors of the background object 220 and the target 220, normalized to unit length. The direction vector d is then expressed in the coordinate system 200 used for the positions of all the landmark objects. For artificial Earth satellites 220, imaged against the star background objects $220_2$, $220_3$, in which the observations 240 and object positions 250 are initially provided or obtained in different kinds of coordinates, these are first reduced to a common system 200. In the following, the X, P, and d vectors may have subscripts i (i=1 to n) to indicate the specific LOP for observation number i.

Using three or more ("n") observations 240, the method 100 determines an estimated position point and velocity information for the observer in the three-dimensional space for which Euclidian distances to the lines of position are minimum for the observer's estimated path (based on the determined position and velocity vectors) using a closed-form least-squares minimization. The estimated position and velocity vectors minimize $\Sigma_i \delta_i^2$, where $\delta_i$ is the distance (e.g., FIGS. 4 and 7) from the point i, where observation i was taken, to LOP; 230 defined by observation $240_i$.

A moving observer 210 has a time-dependent position vector $X(t)=X(t_0)+V(t_0)t+f(t)x_0$, where $X(t_0)$ and $V(t_0)$ are the observer's position and velocity vectors, respectively, at time $t_0$, which are the vectors that the technique described herein determines. In the third term (discussed below), $x_0$ is the unit vector in the direction $X(t_0)$, and f(t) is a scalar function with units of length, and time t is measured from $t_0$, where $t_0$ can be chosen for convenience and need not correspond to the time of a specific observation 240. The observations 240 occur at discrete times $t_i$ measured relative to $t_0$, and need not be periodic or according to any fixed or regular observation schedule. For those times, $X_i=X_0+V_0t_i+f_i x_0$ is expressed using the following shorthand: $X_i=X(t_i)$. $V_0=V(t_0)$, and $f=f(t_i)$, with the last term representing any curvature in the observer's path in the direction $x_0$, such as for a geocentric coordinate system with f(t)<0 being toward the center of the Earth.

The third term could therefore represent the gravitational acceleration of an object in Earth orbit or, for an observer 210 traveling on or near the Earth's surface, the curvature of the geoid. This term can be expressed as $f_i X_0/X_0$, where $X_0=|X_0|$, i.e., $X_0$ is the length of the position vector $X_0$, so that $$X_i = X_0\left(1 + \frac{f_i}{X_0}\right) + V_0 t_i.$$

In implementing the above system 211, the curvature term can be assumed to be small compared to the other terms. i.e., $f_i \ll X_0$ and $f_i \ll |V_0|\Delta t$ where $\Delta t=|t_n-t_1|$ is the span of time covered by the observations 240. In addition, it may be assumed that $f_i/X_0$ (which is small) can be considered known to sufficient accuracy.

For the moving observer 210, the sum $D=\Sigma_i\delta_i^2$ is minimized, wherein each $\delta_i$ represents the distance of LOP; defined by the observation taken at time $t_i$, from $X_i$, the estimated position of the observer 210 at the same instant. If the observer were stationary (i.e., $V_0=0$), all of the LOP vectors 230 would converge within a small volume of space with the observer's estimated position $X_0$ in the center (as in FIG. 5). In the more general case, the lines of position 230 still converge around the observer's estimated path in a way that can be envisioned as a series of snapshots, each at a time $t_i$, in which only line of position i and the observer's position $x_i$ are relevant. In the example of FIG. 6, for instance, the observer 210 takes a first observation 240 at time $t_1$ for which LOP 1 $230_1$ is generated, followed by subsequent observations 240 at times $t_2$ to $t_5$ for which LOP 2 through LOP 5 ($230_2$-$230_5$) are generated in the system 211.

D in this case is expressed as:

$$D=\Sigma_{i=1}^n [P_i^2+X_i^2-2X_i\cdot P_i-(d_i\cdot P_i)^2-(d_i\cdot X_i)^2+2(d_i\cdot X_i)(d_i\cdot P_i)],$$

where time-dependent $X_i$ is a function of the position and velocity parameters 270: $X_0=[x_1, x_2, x_3]$ and $V_0=[v_1, v_2, v_3]$. The above equation is based on the equation for the minimum distance between a point (the observer's position at observation I) and a line (the LOP of observation i), and it uses Lagrange's identity in vector notation to simplify the resulting expression. For each observation i. The observer's position is $X_i$ and the $LOP_i$ is defined by the vectors $P_i$ and $d_i$ obtained directly from the observation. The minimum value of D occurs at $\nabla D=0$, where 0 is the zero vector in 6-dimensional position-velocity space, i.e.

$$\text{i.e., } \left[\frac{\partial D}{\partial x_1}, \frac{\partial D}{\partial x_2}, \frac{\partial D}{\partial x_3}, \frac{\partial D}{\partial v_1}, \frac{\partial D}{\partial v_2}, \frac{\partial D}{\partial v_3}\right] = 0.$$

The $x_1$ equation is thus given as:

$$\frac{\partial D}{\partial x_1} = \frac{\partial}{\partial x_1} \sum_{i=1}^{n} [X_i^2 - 2X_i \cdot P_i - (d_i \cdot X_i)^2 + 2(d_i \cdot X_i)(d_i \cdot P_i)] = 0,$$

where terms not involving $x_1$ have been dropped, and substituting variables A. B, C, and D gives:

$$\frac{\partial}{\partial x_1} \sum_{i=1}^{n} [A - B - (C)^2 + 2D] = 0$$

and similar equations are derived for $x_2$, $x_3$, $v_1$, $v_2$, and $v_3$. Differentiating the four terms A, B, C, and D and substituting $$X_i = X_0\left(1 + \frac{f_i}{X_0}\right) + V_0 t_i,$$

the results for $$\frac{\partial}{\partial x_1}$$

and $$\frac{\partial}{\partial v_1}$$

for each term are given below: the results for $$\frac{\partial}{\partial x_2}, \frac{\partial}{\partial x_3}, \frac{\partial}{\partial v_2},$$

and $$\frac{\partial}{\partial v_3}$$

are similar:

Term A:

$$\frac{\partial}{\partial x_1} X_i^2 = 2x_1\left(1 + \frac{f_i}{X_0}\right)^2 + 2v_1 t_i\left(1 + \frac{f_i}{X_0}\right)$$

$$\frac{\partial}{\partial v_1} X_i^2 = 2x_1 t_i\left(1 + \frac{f_i}{X_0}\right) + 2v_1 t_i^2$$

Term B:

$$\frac{\partial}{\partial x_1}(2X_i \cdot P_i) = 2P_{i_1}\left(1 + \frac{f_i}{x_0}\right)$$

$$\frac{\partial}{\partial v_1}(2X_i \cdot P_i) = 2P_{i_1} t_i$$

Term C:

$$\frac{\partial}{\partial x_1}(d_i \cdot X_i)^2 = 2(d_{i_1}^2 x_1 + d_{i_1} d_{i_2} x_2 + d_{i_1} d_{i_3} x_3)\left(1 + \frac{f_i}{x_0}\right)^2 +$$
$$2(d_{i_1}^2 v_1 t_i + d_{i_1} d_{i_2} v_2 t_i + d_{i_1} d_{i_3} v_3 t_i)\left(1 + \frac{f_i}{x_0}\right)$$

$$\frac{\partial}{\partial v_1}(d_i \cdot X_i)^2 = 2(d_{i_1}^2 x_1 t_i + d_{i_1} d_{i_2} x_2 t_i + d_{i_1} d_{i_3} x_3 t_i)\left(1 + \frac{f_i}{x_0}\right) +$$
$$2(d_{i_1}^2 v_1 t_i^2 + d_{i_1} d_{i_2} v_2 t_i^2 + d_{i_1} d_{i_3} v_3 t_i^2)$$

Term D:

$$\frac{\partial}{\partial x_1}(2(d_i \cdot X_i)(d_i \cdot P_i)) = 2d_{i_1}(d_i \cdot P_i)\left(1 + \frac{f_i}{x_0}\right)$$

$$\frac{\partial}{\partial v_1}(2(d_i \cdot X_i)(d_i \cdot P_i)) = 2d_{i_1} t_i(d_i \cdot P_i)$$

Upon gathering terms, rearranging, and substituting $$\beta_i = \left(1 + \frac{f_i}{x_0}\right)$$

the closed-form least-squares minimization 260 can be expressed in matrix form as:

$$\begin{pmatrix} [(d_{i_1}^2-1)\beta_i^2] & [d_{i_1}d_{i_2}\beta_i^2] & [d_{i_1}d_{i_3}\beta_i^2] & [(d_{i_1}^2-1)t_i\beta_i] & [d_{i_1}d_{i_2}t_i\beta_i] & [d_{i_1}d_{i_3}t_i\beta_i] \\ [d_{i_2}d_{i_1}\beta_i^2] & [(1-d_{i_2}^2)\beta_i^2] & [d_{i_2}d_{i_3}\beta_i^2] & [d_{i_2}d_{i_1}t_i\beta_i] & [(d_{i_2}^2-1)t_i\beta_i] & [d_{i_2}d_{i_3}t_i\beta_i] \\ [d_{i_3}d_{i_1}\beta_i^2] & [d_{i_3}d_{i_2}\beta_i^2] & [(d_{i_3}^2-1)\beta_i^2] & [d_{i_3}d_{i_1}t_i\beta_i] & [d_{i_3}d_{i_2}t_i\beta_i] & [(d_{i_3}^2-1)t_i\beta_i] \\ [(d_{i_1}^2-1)t_i\beta_i] & [d_{i_1}d_{i_2}t_i\beta_i] & [d_{i_1}d_{i_3}t_i\beta_i] & [(d_{i_1}^2-1)t_i^2] & [d_{i_1}d_{i_2}t_i^2] & [d_{i_1}d_{i_3}t_i^2] \\ [d_{i_2}d_{i_1}t_i\beta_i] & [(d_{i_2}^2-1)t_i\beta_i] & [d_{i_2}d_{i_3}t_i\beta_i] & [d_{i_2}d_{i_1}t_i^2] & [(d_{i_2}^2-1)t_i^2] & [d_{i_2}d_{i_3}t_i^2] \\ [d_{i_3}d_{i_1}t_i\beta_i] & [d_{i_3}d_{i_2}t_i\beta_i] & [(d_{i_3}^2-1)t_i\beta_i] & [d_{i_3}d_{i_1}t_i^2] & [d_{i_3}d_{i_2}t_i^2] & [(d_{i_3}^2-1)t_i^2] \end{pmatrix} \begin{pmatrix} x_1 \\ x_2 \\ x_3 \\ v_1 \\ v_2 \\ v_3 \end{pmatrix} = \begin{pmatrix} [-(P_{i_1}-(d_i\cdot P_i)d_{i_1})\beta_i] \\ [-(P_{i_2}-(d_i\cdot P_i)d_{i_2})\beta_i] \\ [-(P_{i_3}-(d_i\cdot P_i)d_{i_3})\beta_i] \\ [-(P_{i_1}-(d_i\cdot P_i)d_{i_1})\tau_i] \\ [-(P_{i_2}-(d_i\cdot P_i)d_{i_2})\tau_i] \\ [-(P_{i_3}-(d_i\cdot P_i)d_{i_3})\tau_i] \end{pmatrix},$$

which is of the form AU=Q, where U and Q are column 6-vectors and A is a 6×6 matrix. The vector U=$(x_1, x_2, x_3, v_1, v_2, v_3)$ is the observer's position/velocity information 270 state at time $t_0$ and the system 211 solves U=$A^{-1}$Q, where $A^{-1}$ is the inverse of A and represents the unsealed covariance matrix of the solution. The square brackets in the above equation represent summations over all n observations: i.e. [ ... ]=$\Sigma$ ..., where the summation runs from i=1 to n; also, for example, $d_{i2}$ represents the second (y-direction) component of vector $d_i$. It is noted that for straight-line movement of the observer 120, there is no curvature term and thus $\beta_i$=1 for all i. Moreover, if the observer is stationary, then $t_i$ can be considered to be 0 for all i since time is measured from when the observer was at $X_0$. In addition, if the observer 210 is moving but the velocity vector is known, the position vector can be obtained from the first three rows on the left side of the above equation.

If the observations 240 have different uncertainties, then the system 211 minimizes a weighted sum $D_w=\Sigma_i(w_i\delta_1)^2$, where $w_i$ is the dimensionless weight of observation i, and weight $w_i=\sigma/\sigma_i$ is the ratio of the average uncertainty of all the observations, $\sigma$, to the uncertainty of the particular observation. $\sigma_i$, and where $\Sigma w_i^2$=n, so $$1/\sigma^2 = \frac{1}{n}\sum(1/\sigma_i^2).$$

The uncertainty of an observation 240 is obtained from the angular measures that define the vector $d_i$ for the observation 240, and such weights can be accommodated by including the extra factor $w_i^2$ in each of the sums in the minimization 260.

Figure 5:
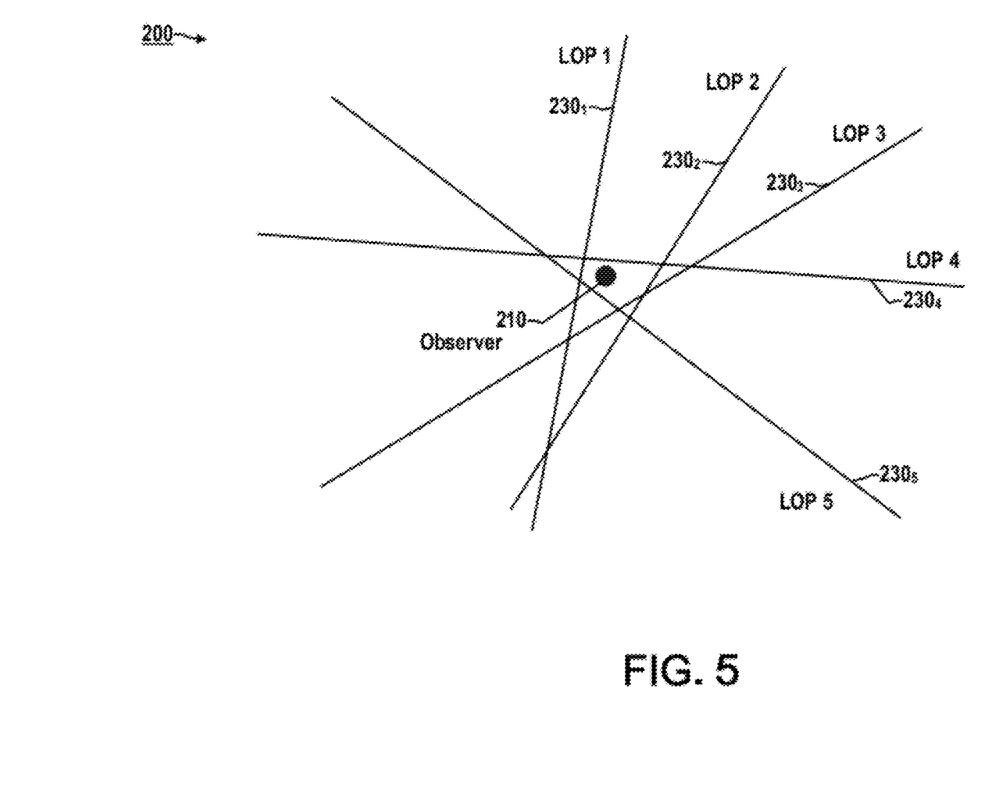
FIG. 5 is a partial side elevation view showing several LOPs obtained by the observer.
Figure 6:
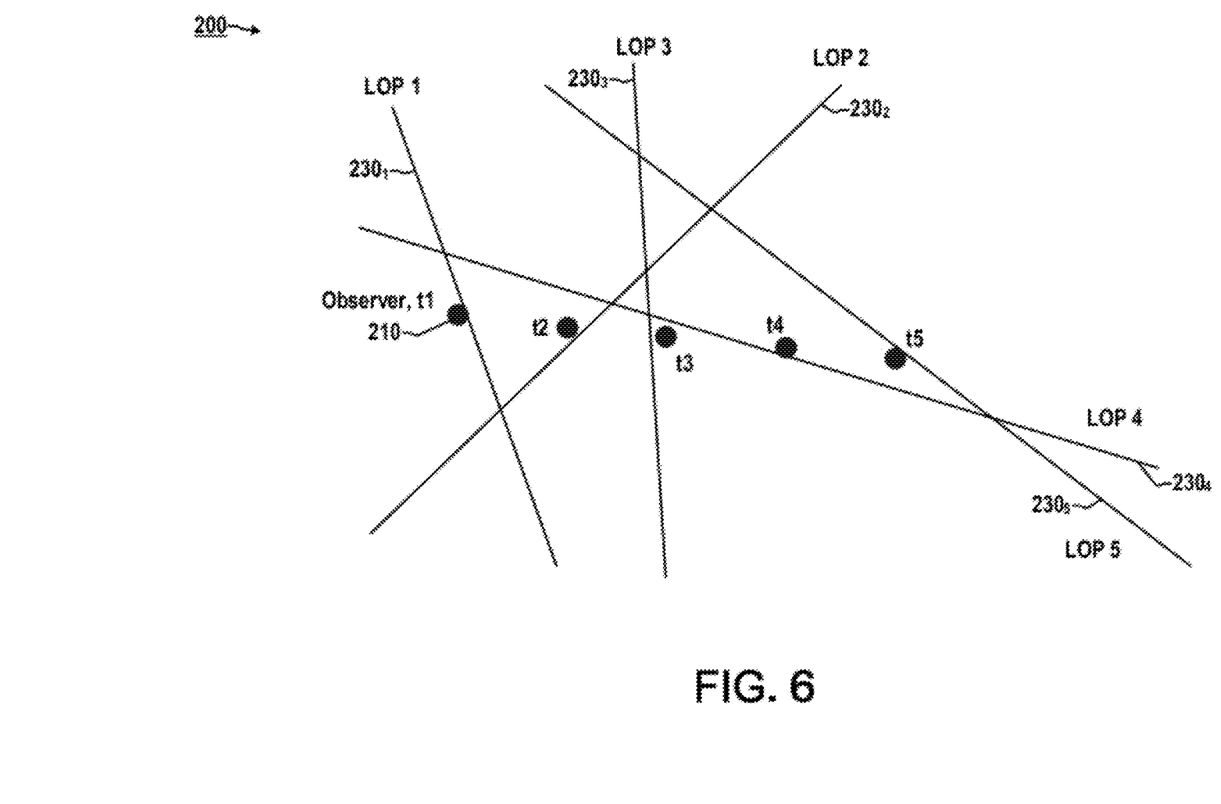
FIG. 6 is a partial side elevation view illustrating several LOPs corresponding to observation images of different objects obtained by a moving observer at different times.

Referring also to FIGS. 5 and 6, (which are both 2-D renditions of 3-D geometry) the closed-form least squares minimization 260 involves minimizing the Euclidean distances (the $\delta_i$'s) in the space 200, which are not themselves measured quantities of the observations 240. FIG. 5 represents the fixed-observer case (wherein $V_0$=0), in which all of the LOPs converge around the observer's position. FIG. 6 is the more general case, in which the LOPs converge around the observer's computed path in such a way that minimizes the distances between the observer's positions and the LOPs in a least-squares sense, each such distance $\delta_i$ evaluated between the estimated position of observation i and the LOP for that observation. The $\delta_i$ distances in practice may have a statistical scatter that reflects measurement errors as well as errors in the predetermined coordinates 250 of the observed objects 220. The minimization, moreover, does not rely on a linearization around an approximately known set of parameters. That is, the determined position and velocity vector components 270 are not corrections to components of assumed vectors. In accordance with further aspects of the present disclosure, the system 211 is Operative to form post-solution residual vectors representing distances between the LOP vectors 230 and the estimated positions of the observer based on the position-velocity determination, and use these to estimate the accuracy of the position and velocity information 270. Furthermore, in the illustrated implementation, the inverse of the 6×6 matrix A 260 above is the unsealed covariance matrix of the solution that can be used to obtain formal uncertainties of the determined position and velocity parameters $(x_1, x_2, x_3, v_1, v_2, v_3)$ and the parameter correlation matrix:

$$\text{If } A' = \left(\frac{D}{2n-6}\right)A^{-1}, \text{ then } \begin{cases} \sigma_i^2 = A'_{ii} \\ \sigma_{ij}^2 = A'_{ij} \\ c_{ij} = A'_{ij}/(\sigma_i\sigma_j) \end{cases}$$

where $\sigma_i^2$ is the formal variance of parameter i (i=1 to 6), $\sigma_{ij}^2$ the formal covariance of parameters i and j, and $c_{ij}$ is the correlation (−1 to +1) between parameters i and j. The variances and covariances of $x_1$, $x_2$, and $x_3$ can be used to form an error ellipsoid representing the uncertainties in the solution for $X_0$ in the three dimensional space 200, and the formal errors can be propagated to any other position on the observer's travel path to determine how the error ellipsoid changes over time. In this case, D/(2n−6) represents the variance of the least-squares fit and is thus a measure of the scatter in the post-solution residuals. In general D=$\Sigma_i\delta_i^2$, where each $\delta_i$ is the distance between the LOP 230 of observation 240i and the computed position of the observer 210 at the corresponding time. The $\delta_i$'s can be calculated as $\delta_i=|d_i'(P_i-X_i)|$, and $$X_i = X_0\left(1 + \frac{f_i}{X_0}\right) + V_0 t_i$$

with $X_0$ and $V_0$ taken from the solution to the minimization 260. The quantity 2n−6 represents the number of degrees of freedom in the solution and the factor 2 reflects the fact that each observation 240 is two-dimensional.

In order to provide information on the effect of individual observations 240 on the determined information 270, the system 211 is operable in certain embodiments to form post-solution residuals, each of which is a vector from the estimated observer location point $X_i$ (based on the determined vectors $X_0$ and $V_0$) to the LOP 230; for observation (both for time $t_i$), using the following equation:

$$\delta_i = d_i \times (P_i - X_i) \times d_i$$

The length of the vector $\delta_i$ is $\delta_i$, and a set of such vectors originating at a common point in the space 200 defines an uncertainty volume for the estimated location in which the influence of each observation is represented by its vector (the length of each vector is preferably squared in one implementation), and the effect of any outliers can be identified using a suitable graphical display or other means.

Figure 7:
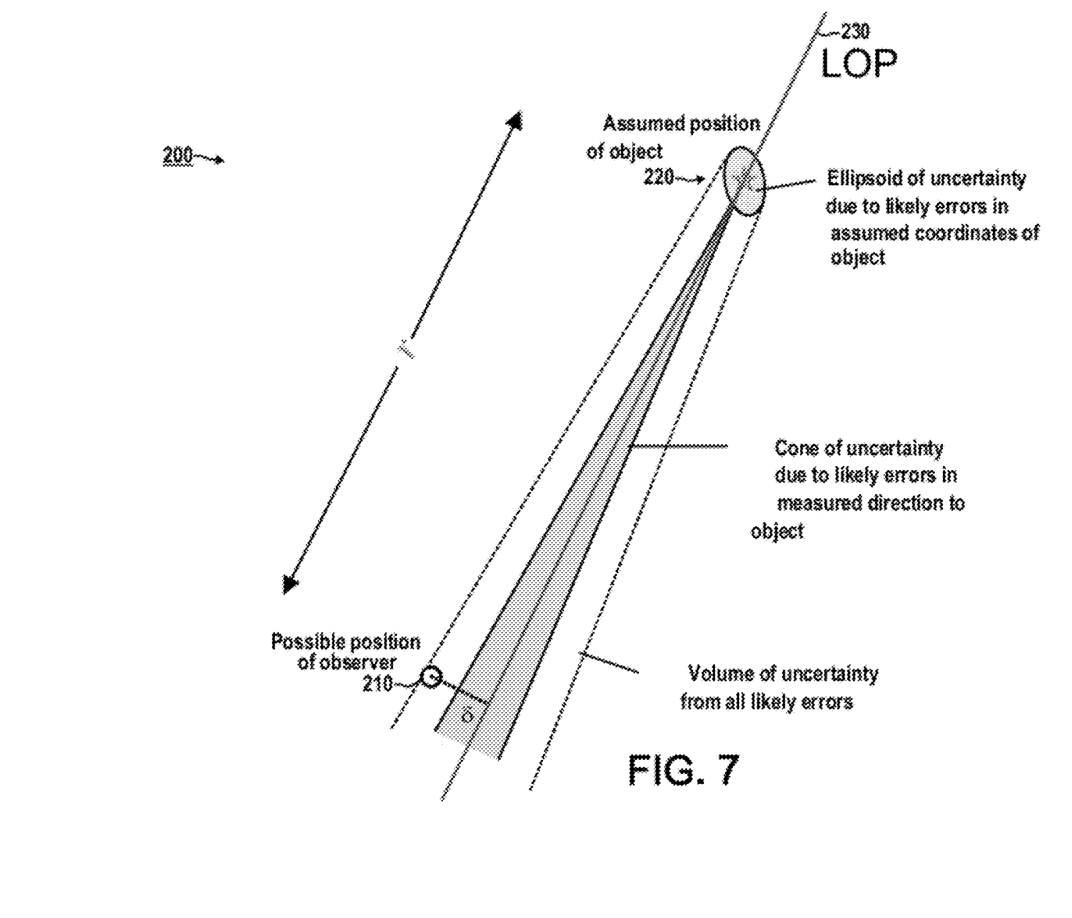
FIG. 7 is a partial side elevation view illustrating geometry of error propagation along an exemplary LOP.

Assuming that the observations 240 are each of similar quality and are well distributed in direction and time, each LOP 230 is defined by both an anchor point in the space 200 at the assumed coordinates of the observed object 220, and the direction of the LOP 230 is determined by the observation image 240 itself. As the LOPs 230 are defined by the equation $X=P+rd$ where r is a scalar of arbitrary value, the statistical uncertainties at a distance r from the object are related by $\sigma_X^2 = \sigma_P^2 + r^2 \sigma_d^2$, where each $\sigma$ is the root-sum-square of the uncertainties in the respective vector components. Since d is always a unit vector. $\sigma_d$ represents an angular uncertainty in radians, which is taken as the centroiding error of the observer's imaging system (digital camera 212 in FIG. 3). In the equation above, the first term on the right represents the average radius of an ellipsoid of uncertainty around the assumed position of the observed object due to the likely errors in its coordinates. The r-term (taken alone) represents a cone of expanding uncertainty with its axis along d and with an apex at the assumed position of the observed object 220 (where r=0), where the apex angle is equal to $2\sigma_d$, as best shown in FIG. 7. The LOP 230 could therefore plausibly be any line originating within the ellipsoid of uncertainty with a direction parallel to any line within the cone of uncertainty. Consequently, the observer's true position is expected to be somewhere within, or not far outside of, each LOP's volume of uncertainty. For observation i, therefore. $\delta_i \approx \sigma_x(r_i)$, for which an estimate of $r_i$ (the distance of the object from the observer) can be used to estimate the accuracy of the position estimate 270. If the distances to the observed objects 220 are generally similar, the values of the computed $\delta_i$'s should also be similar, and a typical $\delta_i$, such as $\bar{\delta}$, is computed by the system 211 and used as a predictor of the scatter in the post-fit residuals, where $$\bar{\delta}^2$$

is approximately equal to the variance of the fit.

The exemplary system 211 is further operative to estimate a curvature of the observer's path based at least partially on the estimated position point $X_0 = X(t_0)$. The third term in the motion model $X(t) = X(t_0) + V_0 t + f(t)x_0$ describes the curvature of the observer's path in the direction $x_0$. For example, in a geocentric coordinate system of the space 200, negative values of the third term (e.g. $f(t)<0$) indicate curvature toward the center of the Earth, such as for an observer moving on or near the surface of the Earth. For the times of individual observations 240 $f_i = f(t_i)$, which can be written $$\left(\frac{f_i}{x_0}\right) x_0$$

with $f_i/X_0$ being a known dimensionless quantity. For short tracks on the surface of the Earth, moreover, $f_i/X_0$ is small (e.g., for $vt_i=100$ km, $f_i=-0.8$ km, and thus $f_i/X_0 \approx 10^{-4}$). The curvature term finds particular utility in navigation applications on or near the surface of the Earth in which observations 240 are collected over a track that may extend to tens of kilometers. In this regard, the curvature term in the minimization 260 can be used in place of an acceleration term, which would otherwise require three more unknowns (and at least two more observations 240) and which would, in many cases, be poorly determined because of its smallness compared to observational error. For relatively short distances, the magnitude of the curvature term can be represented by a parabolic approximation:

$$f_i = -\frac{1}{2}\frac{(vt_i)^2}{R} \text{ or } \frac{f_i}{X_0} = -\frac{1}{2}\frac{(vt_i)^2}{RX_0} = \underbrace{-\frac{1}{2}\left(\frac{vt_i}{X_0}\right)^2}_{\text{if } R=X_0},$$

where R is the radius of curvature of the path, $v=|V_0|$ is the speed of the observer's motion, and $vt_i \ll R$. The length $vt_i$ is the distance traveled from the reference point (where t=0 and $X=X_0$) to the observer's position when observation i is taken at time $t_i$. For an observer 210 in a circular Earth orbit, $R=X_0$ and $v^2 = GM/X_0$, where GM is the geocentric gravitational constant. For an observer 210 on or near the Earth's surface, a great-circle course is implied, and if the Earth is considered to be a sphere. $R=X_0=a+h$, where a is the radius of the Earth and h is the height above sea level. In reality. $R \neq X_0$, that is, the local radius of curvature is not the same as the local geocentric distance, and both vary from place to place. Given an adopted Earth reference ellipsoid (fitted to the equipotential surface at mean sea level) with an equatorial radius $a_e$, the following holds:

$$R = r_c + h$$

and $$X_0 = \rho + h,$$

where $r_c$ is the local radius of curvature of the ellipsoid in the direction of travel. $\rho$ is the distance from the geocenter to the ellipsoid at the location of the observer 210, and h is the observer's height above the ellipsoid. The values of $r_c$ and $\rho$ are functions of latitude, and $r_c$ also depends on the direction of the observer's travel. Therefore, to compute R and $X_0$ for the curvature term, the observer's latitude, course, and height will have to be approximately known.

The above examples are merely illustrative of several possible embodiments of various aspects of the present disclosure, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (i.e. that is functionally equivalent), even though not structurally equivalent to the disclosed structure which performs the function in the illustrated implementations of the disclosure. In addition, although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The invention claimed is:

1. An angles-only method of determining position and velocity information for a moving observer in a three-dimensional space, the method comprising:

obtaining an integer number n observations by the observer of objects with known positions at n different times, where n is at least three;

generating line of position vectors in the three-dimensional space individually corresponding to one of the observations; and determining at least one estimated position point and velocity information for the observer in the three-dimensional space for which Euclidian distances between the line of position vectors and the corresponding observer positions are minimum using a closed-form least-squares minimization.

2. The method of claim 1, wherein for a specific observation, one of the observed objects is spaced from the observer by a first distance, wherein a second one of the observed objects is spaced from the observer by a second distance, and wherein the second distance is at least twice as long as the first distance.

3. The method of claim 2, further comprising:
forming post-solution residual vectors representing distances between the line of position vectors and the determined observer positions for the corresponding observations; and
estimating an accuracy of the position and velocity information based at least in part on the residual vectors.

4. The method of claim 3, further comprising estimating a curvature of a path of the observer based at least partially on the at least one estimated position point and/or estimated velocity.

5. The method of claim 4, wherein at least one of the observed objects are moving.

6. The method of claim 2, further comprising estimating a curvature of the observer's path based at least partially on the at least one estimated position point and/or velocity.

7. The method of claim 2, wherein at least one of the observed objects are moving.

8. The method of claim 1, further comprising:
forming post-solution residual vectors representing distances between the line of position vectors and the determined observer positions for the corresponding observations; and
estimating an accuracy of the position and velocity information based at least in part on the residual vectors.

9. The method of claim 1, further comprising estimating a curvature of a path of the observer based at least partially on the at least one estimated position point and/or velocity.

10. The method of claim 1, wherein at least one of the observed objects are moving.

11. A system for determining position and velocity information for a moving observer in a three-dimensional space using angles-only measurements, comprising:
an imaging apparatus operative to obtain an integer number n observation images of n objects, where n is at least three; and
a digital processing system coupled to receive the observation images from the imaging apparatus, the digital processing system being operative to generate line of position vectors in the three-dimensional space individually corresponding to one of the observations using known positions of the observed objects, to determine at least one estimated position point and velocity information for the observer in the three-dimensional space for which Euclidian distances between the line of position vectors and the corresponding observer positions are minimum using a closed-form least-squares minimization.

12. The system of claim 11, further comprising a position database storing the known positions of the observed objects.

13. The system of claim 11, wherein at least one of the observed objects are moving.

14. The system of claim 11, wherein for a specific observation, one of the observed objects is spaced from the observer by a first distance, wherein a second one of the observed objects is spaced from the observer by a second distance, and wherein the second distance is at least twice as long as the first distance.

15. The system of claim 11, wherein the digital processing system is operative to form post-solution residual vectors representing distances between the line of position vectors and the determined observer positions for the corresponding observations, and to estimate an accuracy of the position and velocity information based at least in part on the residual vectors.

16. The system of claim 11, wherein the digital processing system is operative to estimate a curvature of a path of the observer based at least partially on the at least one estimated position point and/or velocity.

17. A computer-readable medium with computer-executable instructions for determining position and velocity information for a moving observer in a three-dimensional space, the computer-readable medium comprising computer-executable instructions for:
obtaining an integer number n observations by the observer of objects with known positions at n different times, where n is at least three;
generating line of position vectors in the three-dimensional space individually corresponding to one of the observations; and
determining at least one estimated position point and velocity information for the observer in the three-dimensional space for which Euclidian distances between the line of position vectors and the corresponding observer positions are minimum using a closed-form least-squares minimization.

18. The computer-readable medium of claim 17, further comprising computer-executable instructions for:
forming post-solution residual vectors representing distances between the line of position vectors and the determined observer position; and
estimating an accuracy of the position and velocity information based at least in part on the residual vectors.

19. The computer-readable medium of claim 17, further comprising computer-executable instructions for estimating a curvature of a path of the observer based at least partially on the at least one estimated position point and/or velocity.

* * * * *